(12) United States Patent
Zaloom

(10) Patent No.: US 10,135,480 B1
(45) Date of Patent: Nov. 20, 2018

(54) COUPLING MECHANISMS FOR ENHANCING THE FUNCTIONALITY OF SMART PHONES AND TABLET COMPUTERS

(71) Applicant: Joseph Zaloom, Falls Church, VA (US)

(72) Inventor: Joseph Zaloom, Falls Church, VA (US)

(73) Assignee: JZM TECHNOLOGIES, INC., Falls Church, VA (US)

( * ) Notice: Subject to any disclaimer, the term of this patent is extended or adjusted under 35 U.S.C. 154(b) by 0 days.

(21) Appl. No.: 15/229,644

(22) Filed: Aug. 5, 2016

Related U.S. Application Data

(60) Provisional application No. 62/263,434, filed on Dec. 4, 2015.

(51) Int. Cl.
| | |
|---|---|
| *F16M 11/00* | (2006.01) |
| *H04B 1/3877* | (2015.01) |
| *F16M 11/24* | (2006.01) |
| *H04B 1/3888* | (2015.01) |

(52) U.S. Cl.
CPC .......... *H04B 1/3877* (2013.01); *F16M 11/24* (2013.01); *H04B 1/3888* (2013.01)

(58) Field of Classification Search
USPC ........................................................ 248/685
See application file for complete search history.

(56) References Cited

U.S. PATENT DOCUMENTS

| | | | | | |
|---|---|---|---|---|---|
| 5,067,573 | A | * | 11/1991 | Uchida | G06F 1/1626 345/173 |
| 5,530,208 | A | * | 6/1996 | Moriconi | G06F 1/1613 178/19.01 |
| 5,703,626 | A | * | 12/1997 | Itoh | G06F 1/1626 178/19.01 |
| 6,356,443 | B2 | * | 3/2002 | Jenks | G06F 1/1626 343/720 |
| 6,681,333 | B1 | * | 1/2004 | Cho | G06F 1/1626 345/179 |
| 6,819,557 | B2 | * | 11/2004 | Lilenfeld | G06F 3/03545 345/179 |
| 6,924,791 | B1 | * | 8/2005 | Nicolas | G06F 1/1626 178/18.01 |
| 8,194,055 | B2 | * | 6/2012 | Liu | G06F 1/1656 345/179 |
| 8,255,015 | B2 | * | 8/2012 | Wang | G06F 1/1626 455/575.1 |
| 8,339,123 | B2 | * | 12/2012 | Chen | G01C 17/30 324/202 |
| 8,736,585 | B2 | * | 5/2014 | Omata | G06F 1/1626 345/173 |
| 9,124,681 | B2 | * | 9/2015 | Park | H04M 1/0262 |
| 9,144,279 | B2 | * | 9/2015 | Venida | A45C 11/34 |
| 2003/0210223 | A1 | * | 11/2003 | Park | G06F 1/1626 345/156 |
| 2006/0044288 | A1 | * | 3/2006 | Nakamura | G06F 1/1626 345/179 |
| 2007/0117430 | A1 | * | 5/2007 | Lin | G06F 1/1626 439/164 |
| 2009/0128521 | A1 | * | 5/2009 | Chen | G06F 1/1626 345/179 |

(Continued)

Primary Examiner — Monica E Millner

(57) ABSTRACT

Simple coupling mechanisms for attaching electronic styluses to personal information display and input devices and their use as propping instruments to position these devices to various angles and orientations with respect to a base or resting surface.

3 Claims, 20 Drawing Sheets

(56) References Cited

U.S. PATENT DOCUMENTS

2010/0007251 A1* 1/2010 Hsu ..................... G06F 1/1601
  312/223.1
2013/0342976 A1* 12/2013 Chung ................ H05K 5/0234
  361/679.01

* cited by examiner

COUPLING MECHANISMS FOR ENHANCING THE FUNCTIONALITY OF SMART PHONES AND TABLET COMPUTERS

RELATED APPLICATION

This application claims priority to U.S. provisional patent application 62/263,434, filed Dec. 4, 2015, the entirety of which is incorporated by reference.

TECHNICAL FIELD

The technology herein relates to simple mechanisms for coupling electronic styluses to personal information display and input devices and their use to position these devices to various angles and orientations with respect to a base or resting surface.

BACKGROUND OF INVENTION

Since the introduction of the Apple iPhone in June 2007, the number of computing devices known as smart phones and tablets has vastly increased. These devices typically consist of a touch screen that fronts a highly sophisticated, versatile, thin, and lightweight computer that among other things, serves as a point-and-shoot camera, a video camera, a face-to-face wireless communications device, a voice recorder, an electronic notepad, and even an electronic canvas. So much so, that Samsung offers a line of high end smart phones with an imbedded stylus under the "Galaxy Note" tradename and Apple has recently debuted a new line of electronic notepads with a highly sophisticated optional stylus under the "iPad Pro" tradename. Yet, the Samsung Galaxy line of smart phone devices, despite being fronted by a spacious touch-screen display panel, glaringly lacks a support mechanism that can position the device to various angles and orientations with respect to a resting surface, which would be highly useful to steady a camera shot, position the video camera at an optimum angle for recording a scene or an interview, for communicating wirelessly with another person over an extended period of time without tiring one's hand, as well as for consuming information or entertainment while freeing both hands to eat, or to perform other tasks concurrently. The Apple iPad Pro on the other hand while being an excellent platform for digital artists and designers, does not provide any mechanism that would couple its sleek "Apple Pencil" to its tablet when the pencil is not being used and does not provide any means for propping the device to various angles and orientations for enhanced functionality and ergonomics. Furthermore, a plethora of electronics suppliers, including Apple, offer a slew of highly sophisticated smart phones with highly sensitive touch screens, that do not accommodate a stylus, forcing the user to use their fingers to take notes or to draw; making such tasks highly impractical and uncomfortable to accomplish. These smart phones may benefit greatly from the inclusion of a flat stylus that does not add much thickness to a smart phone, but that may vastly increase the functionality of smart phones as note taking and sketching instruments.

Therefore, a need exists for simple mechanisms that can securely and inconspicuously couple a thin stylus to thin mobile personal information display and input devices and to enable that stylus to prop the device to various angles and orientations with respect to a resting surface or base.

SUMMARY OF THE INVENTION

I invented and disclose herein methods for attaching and using a stylus to personal information display and input devices as well as for using this accessory as a means to prop and position these devices to various angles and orientations with respect to a resting surface or base.

The stylus propping method consists of placing strategically located full or partial cavities with straight, slanted, or sloping walls on the back plate or the protective cover of a personal information display and input device, with each cavity configured to receive one end of a matching stylus at a specific angle and orientation with respect to the back plate or the protective cover of a personal information display and input device. The stylus is then used to prop the personal information display and input device at a specific angle or orientation with respect to a resting surface or base by magnetically keying one end of the stylus into a partially or fully matching receiving cavity or cavities with horizontal, vertical, or slanted walls positioned in the back plate or the protective cover of a personal information display and input device, and placing the other end of the stylus on a resting surface or base. The top end of the stylus may be magnetized and using the magnetized end to magnetically latch into matching a partially or fully rectangular or circular socket or sockets positioned in the back of a personal information display and input device, or the protective cover of a personal information display and input device, in order to fix the angular position of the personal information display and input device. The angular position and orientation of the personal information display and input device can then be adjusted at any time by detaching the stylus from the cavity in which it is inserted and reinserting it into a different cavity with a different slant or slope, also located on the back panel of the personal information display and input device or the protective cover of a personal information display and input device, and re-placing the other end of the stylus on a resting surface or base.

The stylus, which may be cylindrical or have a flat opposite side surfaces, is stowed in the back panel of a personal information display and input device, or the protective cover of a personal information display and input device, in the flush position (having a surface on the same plane as the back plane or the cover of the back pane) by magnetically fastening the stylus into a matching cavity carved up in the back panel of a personal information display and input device or the back of a protective cover of a personal information display and input device. The fastening of the stylus to the back panel of a personal information display and input device, or the protective cover of a personal information display and input device, may be by magnetically fastening the offset top of the flat stylus into a matching lateral cavity in the back of a personal information display and input device, or the protective cover of a personal information display and input device.

DETAILED DESCRIPTION

While the illustrations described below refer to an all-enveloping protective cover for a personal information display and input device, the concept of this invention may also be applied directly to a personal information display and input device without the need for a protective cover for its implementation.

Figure 1:
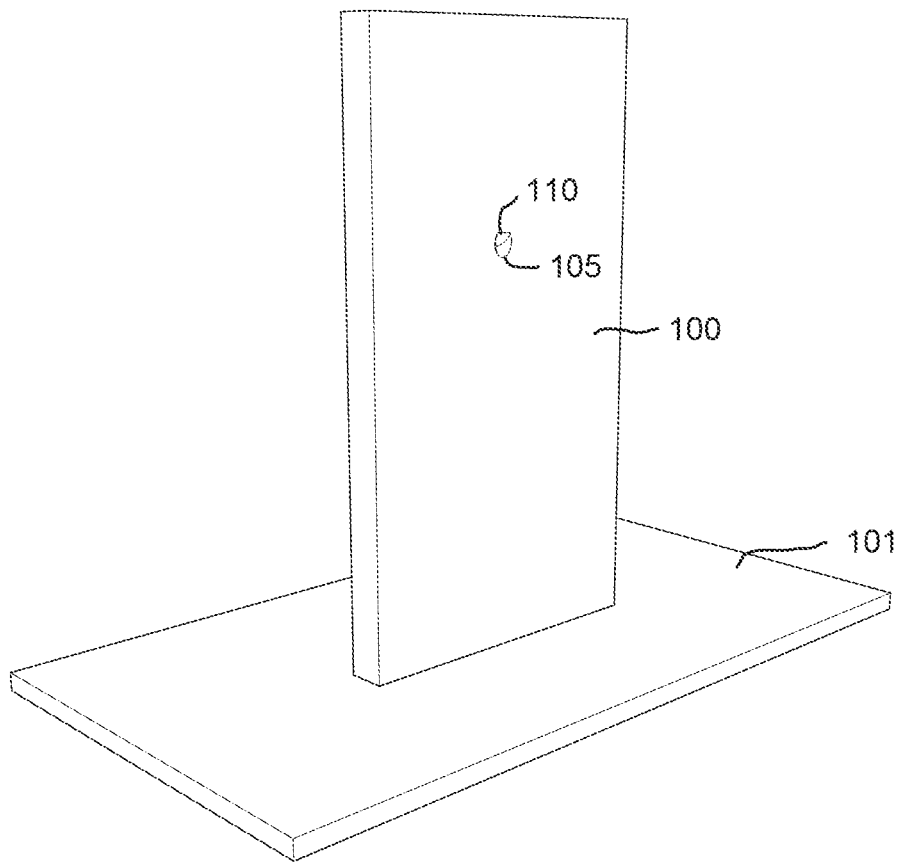
FIGS. 1 to 5 illustrate the concept of the invention as it relates to propping a personal information display and input device to various angles and orientations using a stylus.

FIG. 1 to FIG. 5 are used to illustrate the concept of the invention as it relates to propping a personal information display and input device to various angles and orientations using a stylus. FIG. 1 illustrates a vertical slab 100 resting on flat surface 101 with a circular cavity 105 having a slanted bottom 110 located in the top tier of slab 100.

Figure 2:
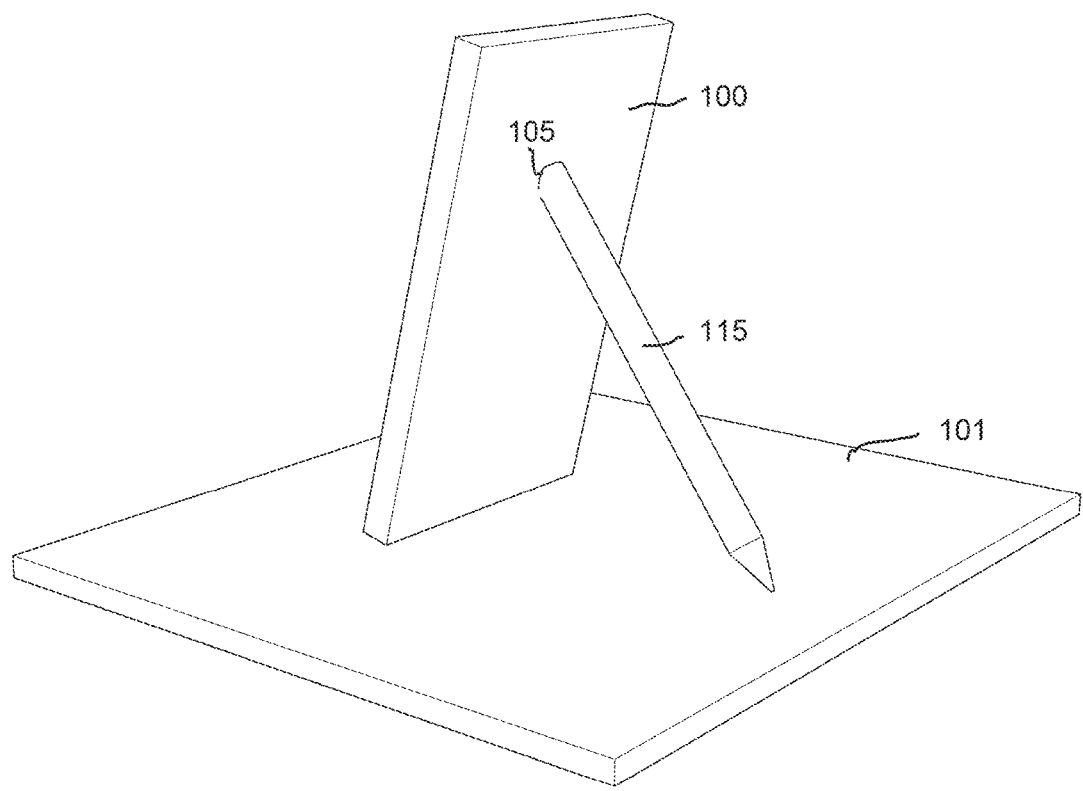

FIG. 2 illustrates how a cylindrically shaped stylus 115 may support a slab 100 at an incline by partially resting in slanted cavity 105 of slab 100. The cylindrically shaped stylus 115 may be made to strongly latch into the slanted cavity 105 of slab 100 by attaching magnetically to the cavity if the cavity is made of a metallic material and the end of the cylindrically shaped stylus 115 is covered with a magnetic surface or substance, or vice versa.

Figure 3:
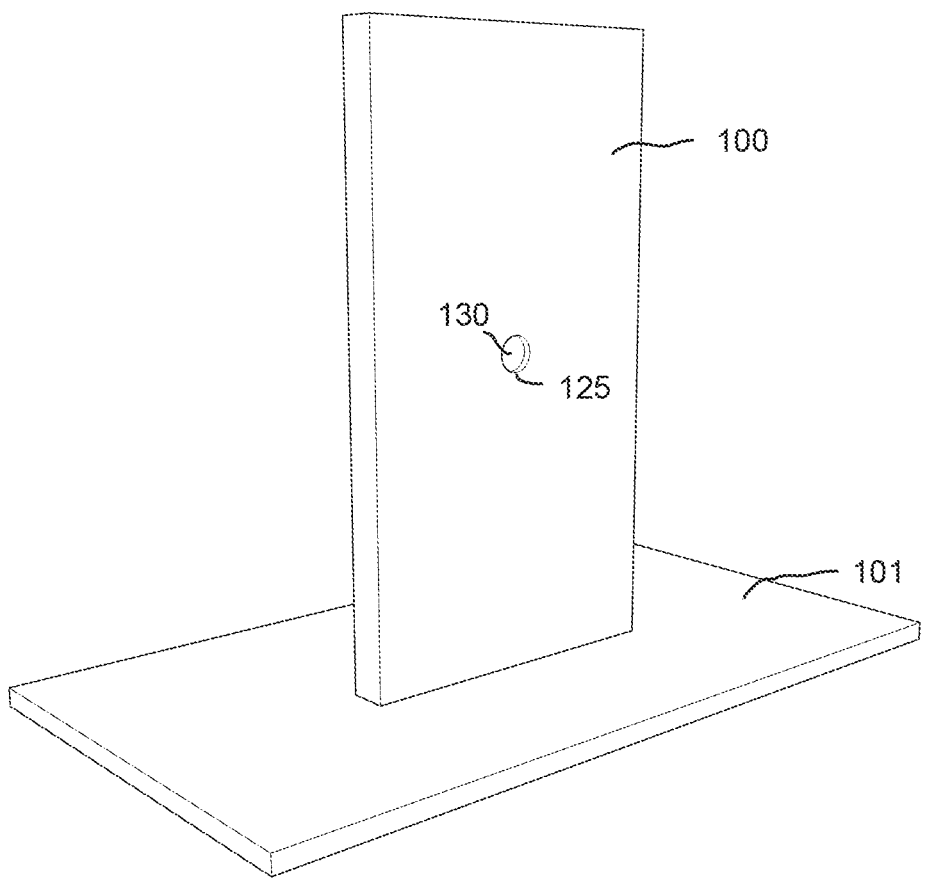

FIG. 3. Illustrates a vertical slab 100 resting on a flat surface 101 with a circular cavity 125 having a straight bottom 130 located at the center of slab 100.

Figure 4:
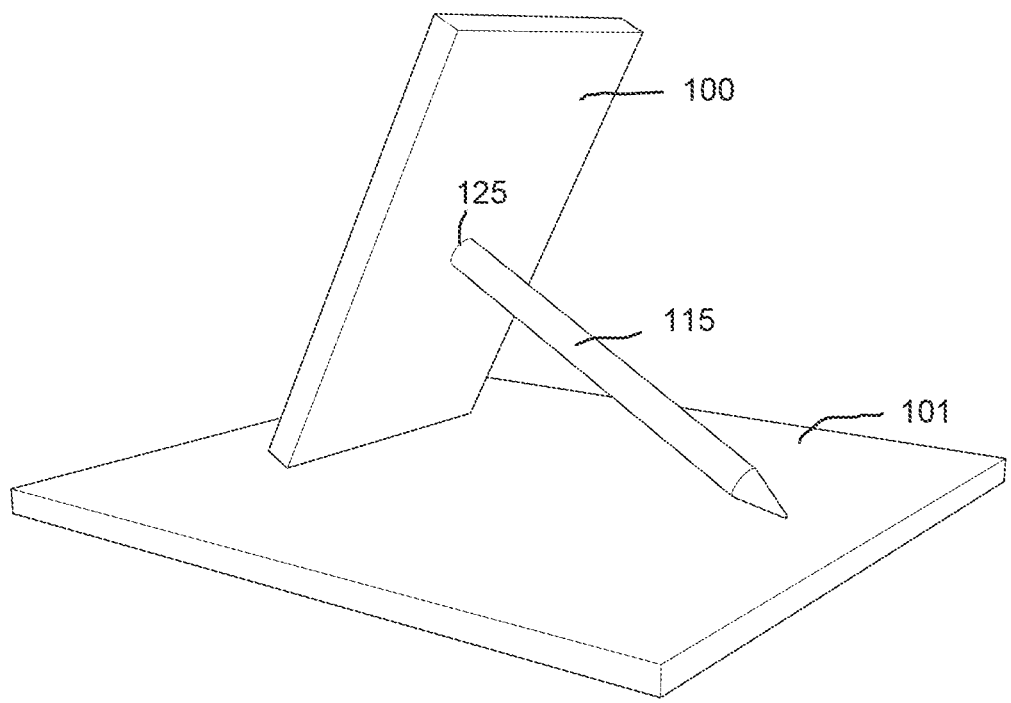

FIG. 4 illustrates how a cylindrically shaped stylus 115 may support a slab 100 at an alternative inclined position by fully inserting into straight cavity 125 of slab 100. The cylindrically shaped stylus 115 may be made to strongly latch into cavity 125 of slab 100 by attaching magnetically to the cavity if the cavity is made of a metallic material and the end of the cylindrically shaped stylus 115 is covered with a magnetic surface or substance, or vice versa.

Figure 5:
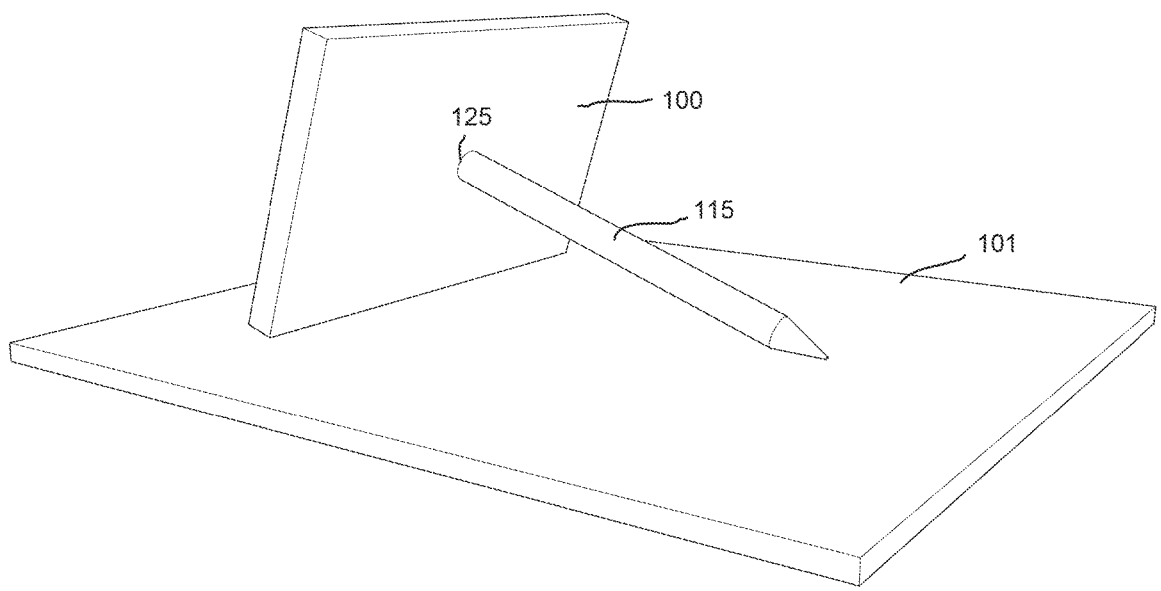

FIG. 5 illustrates how vertical slab 100 may be made to rest on flat surface 101 in an alternative, landscape orientation, simply by rotating slab 100 around the axis of cylindrically shaped stylus 115.

Figure 6:
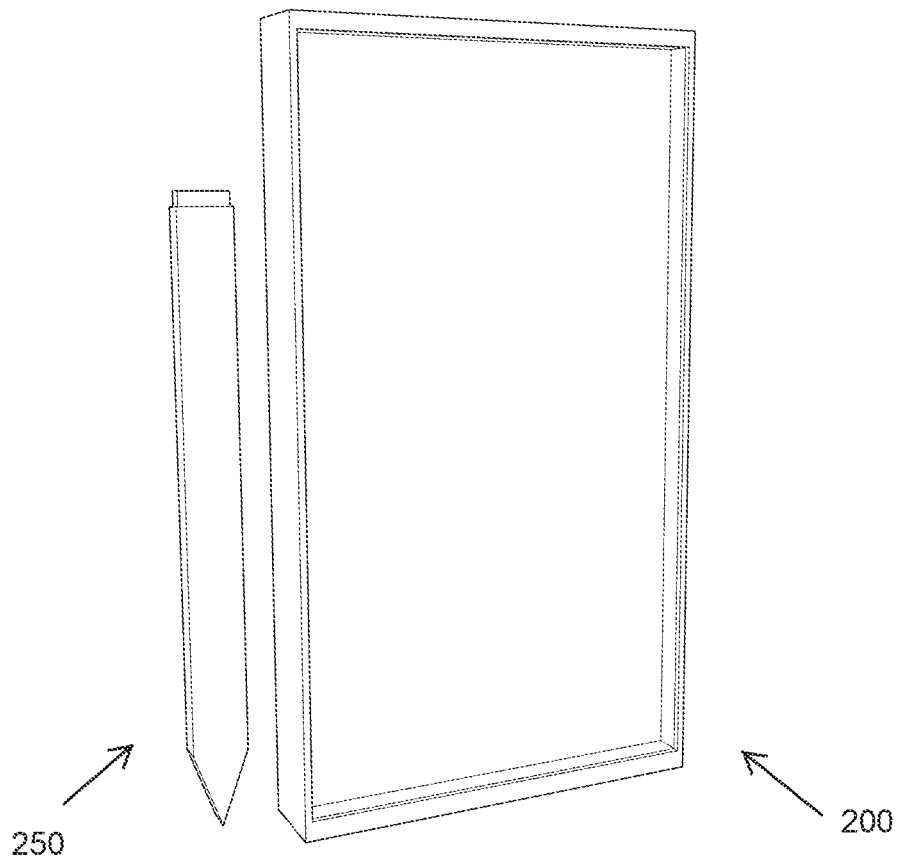
FIG. 6 illustrates a front view of an embodiment of a back cover for a personal information display and input device, or a smart phone, with an associated flat stylus.

FIG. 6 illustrates a 3D front view of a non-limiting embodiment of an enveloping protective cover for a personal information display and input device 200 and an associated flat stylus 250.

Figure 7:
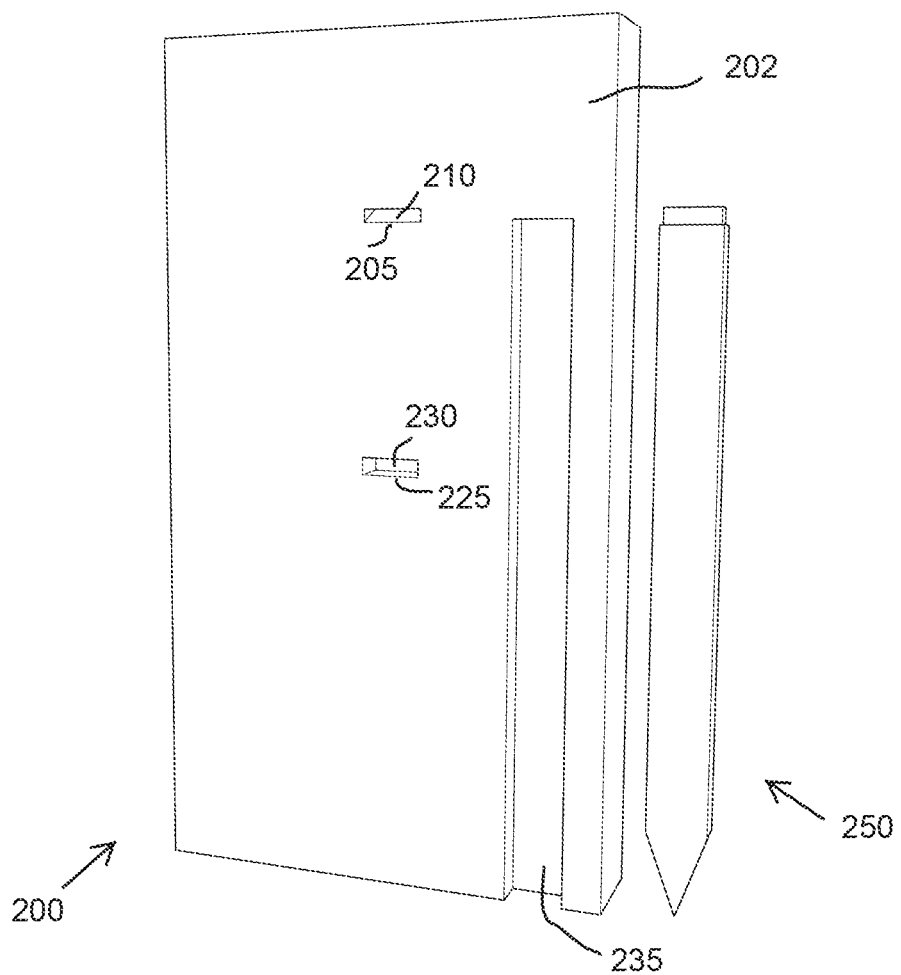
FIG. 7 illustrates a back view of a non-limiting embodiment of a back cover for a personal information display and input device and associated stylus, with cavities cut on the back surface of the cover; cavities which are shaped to receive an end of a flat stylus at varying angles.

FIG. 7 illustrates a 3D back view of a non-limiting embodiment of an enveloping protective cover for a personal information display and input device 200, with the back side of its back panel 202 exposed, along with an associated flat stylus 250. The back side of the back panel 202 includes cavity 205 with slanted walls 210 located in the top tier of protective cover 200 and a second cavity 225 with straight walls 230 located in the middle of protective cover 200. The back panel 202 of the protective cover includes an open recession 235 on the right side of the cover of the personal information display and input device 200 for receiving and stowing a flat stylus 250 into protective cover 200 in the flush position.

Figure 8:
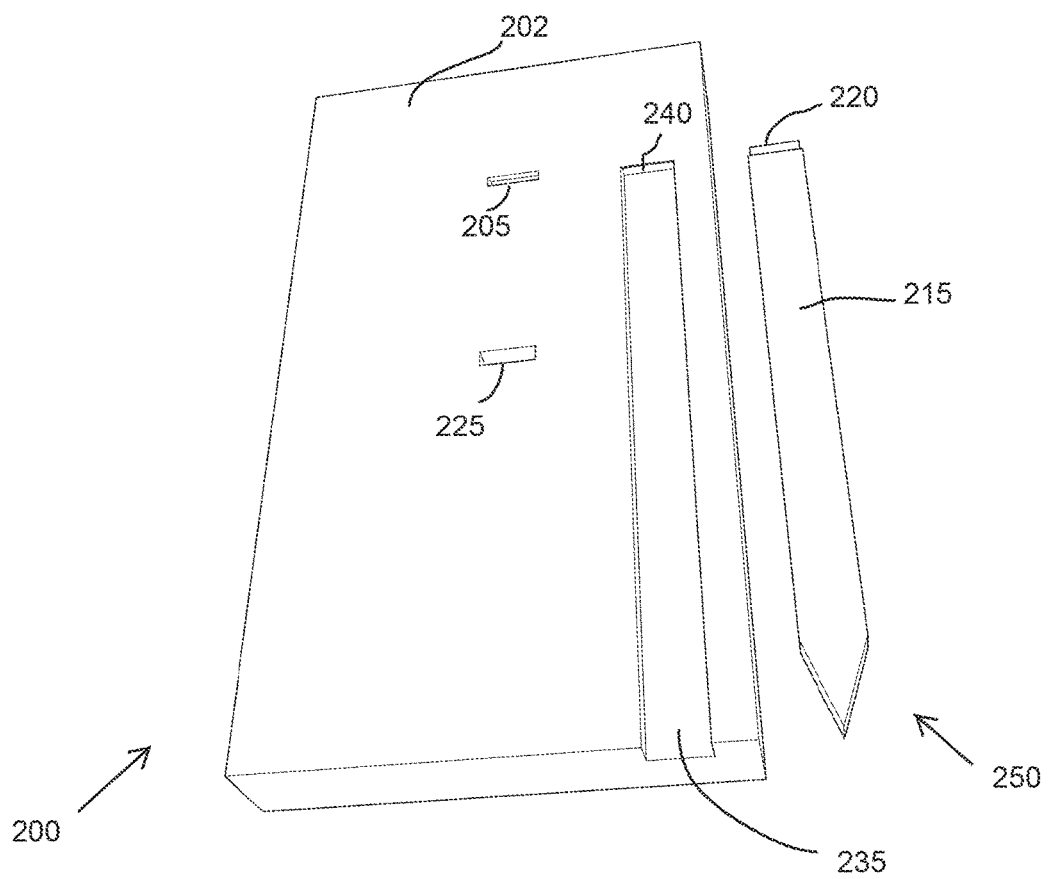
FIG. 8 illustrates a perspective back view of a non-limiting embodiment of a back cover for a personal information display and input device and associated stylus, illustrating how the stylus can be secured into the back surface of the back cover of the personal information display and input device enclosure.

FIG. 8 illustrates a perspective back view of a non-limiting embodiment of an enveloping protective cover for a personal information display and input device 200 with the back side of its back panel 202 exposed from a perspective that shows cavity 240 at the far end of recession 235 which is designed to snugly receive the offset top 220 of flat stylus 250 while keeping the main shaft 215 of flat stylus 250 exposed while being stowed in recession 235 in the back panel 202 of the protective cover of personal information display and input device 200. The offset top 220 of flat stylus 250 may be made to strongly latch into cavity 240 at the far end of recession 235 if the cavity 240 is made of a metallic material and the offset top 220 of stylus 250 is covered with a magnetic surface or substance, or vice versa.

Figure 9:
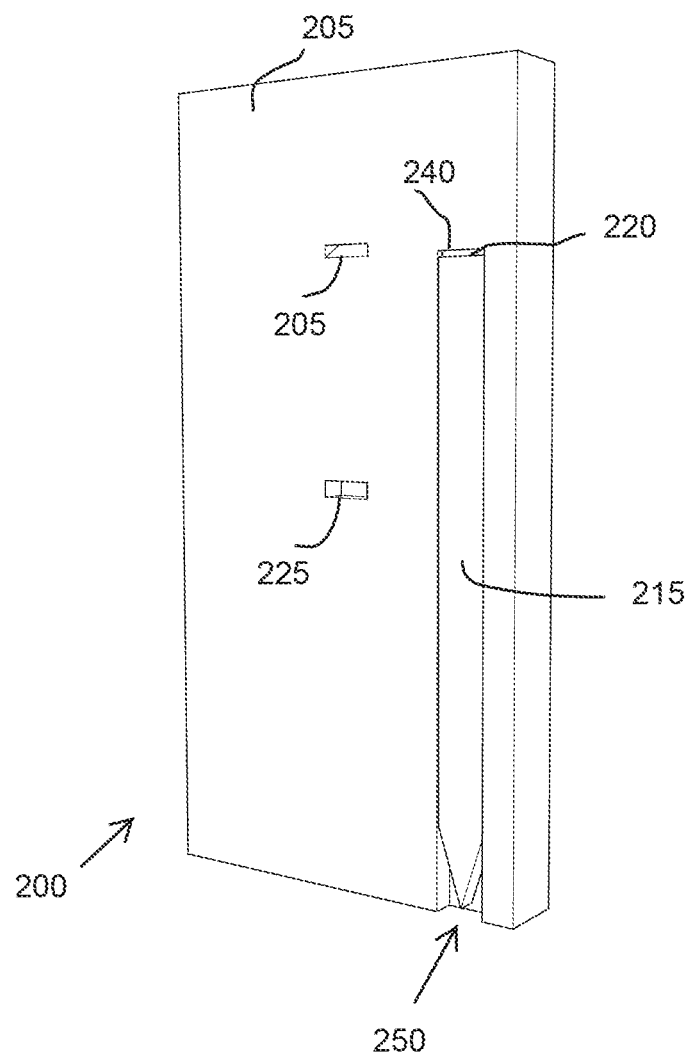
FIG. 9 illustrates a perspective back view of a non-limiting embodiment of a back cover for a personal information display and input device and associated stylus with the stylus stowed in the back surface of the personal information display and input device enclosure.

FIG. 9 illustrates a perspective side view of a non-limiting embodiment of flat stylus 250 snugly stowed in the back surface of the protective cover of personal information display and input device 200.

Figure 10:
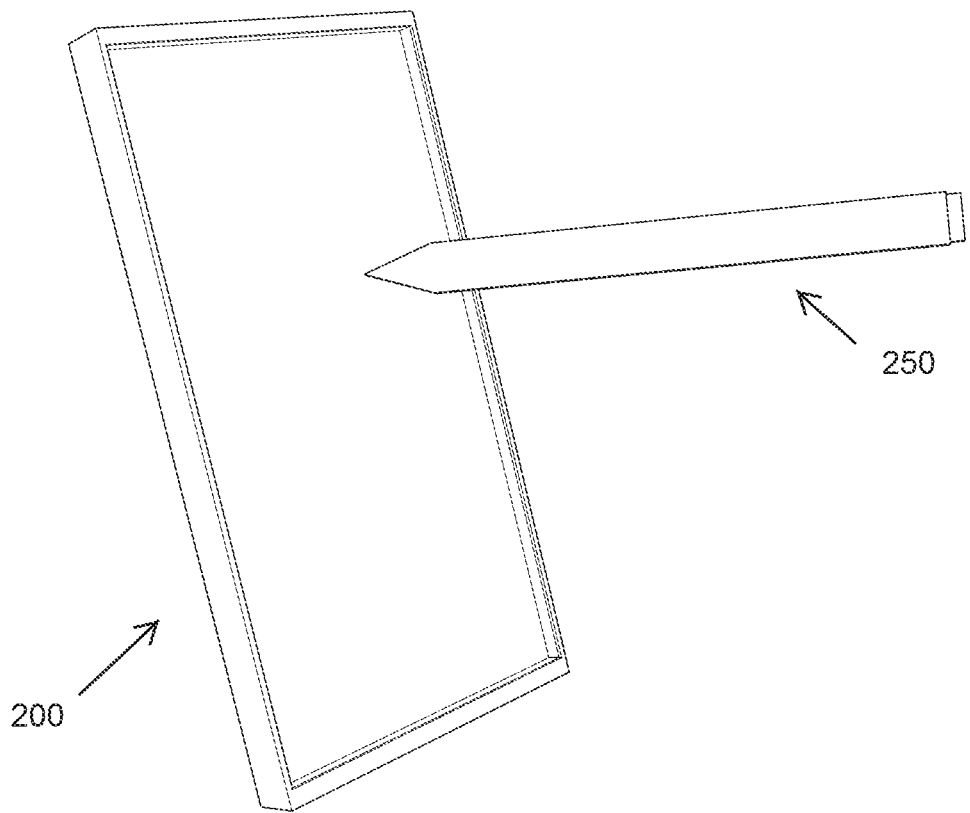
FIG. 10 illustrates a perspective front view of a stylus as it would be positioned for writing on the surface of a personal information display and input device.

FIG. 10 illustrates a perspective front view of the flat stylus 250 as it would be positioned for writing on the surface of a personal information display and input device 200.

Figure 11:
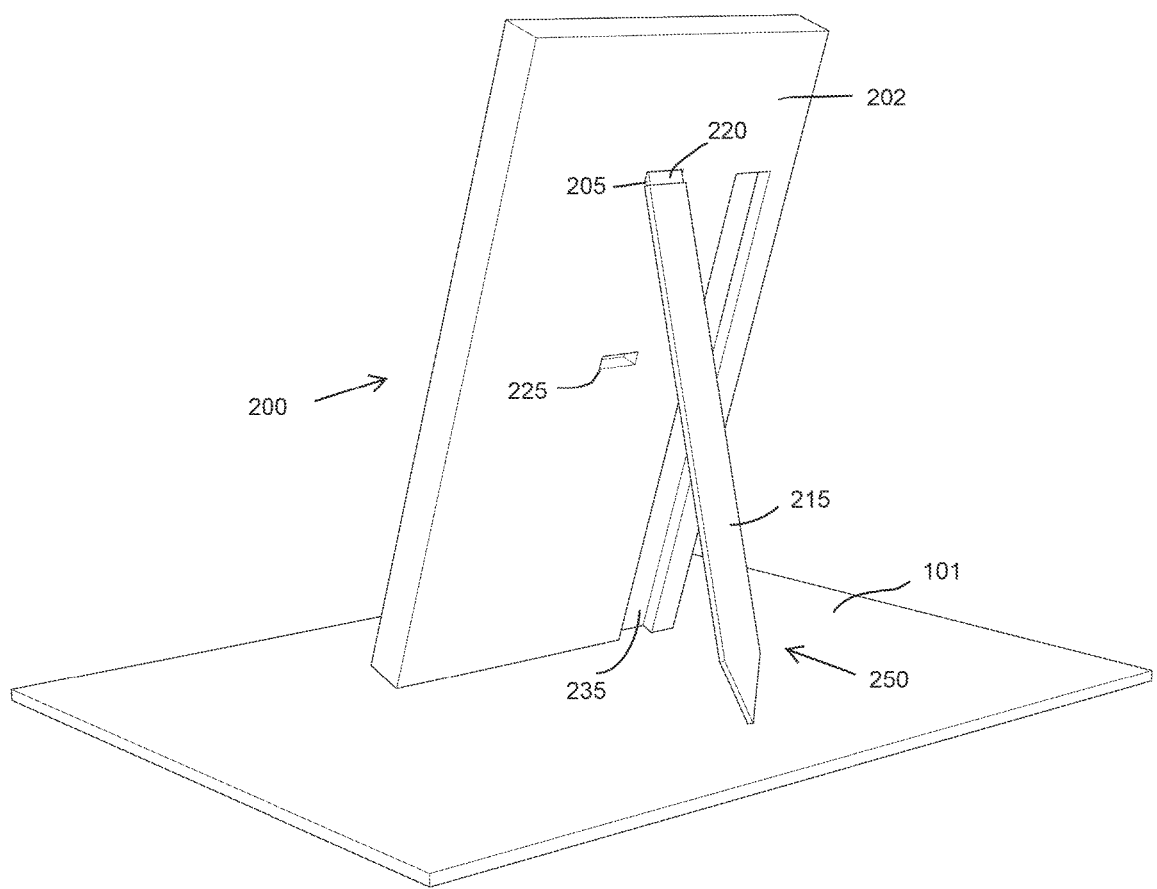
FIG. 11 illustrates a back perspective view of a stylus used to prop a personal information display and input device in the portrait orientation.

FIG. 11 illustrates a back perspective view of the offset top 220 of flat stylus 250 inserted into top cavity 205 of the protective cover of personal information display and input device 200 in order prop that device at a specific angular position in the portrait orientation.

Figure 12:
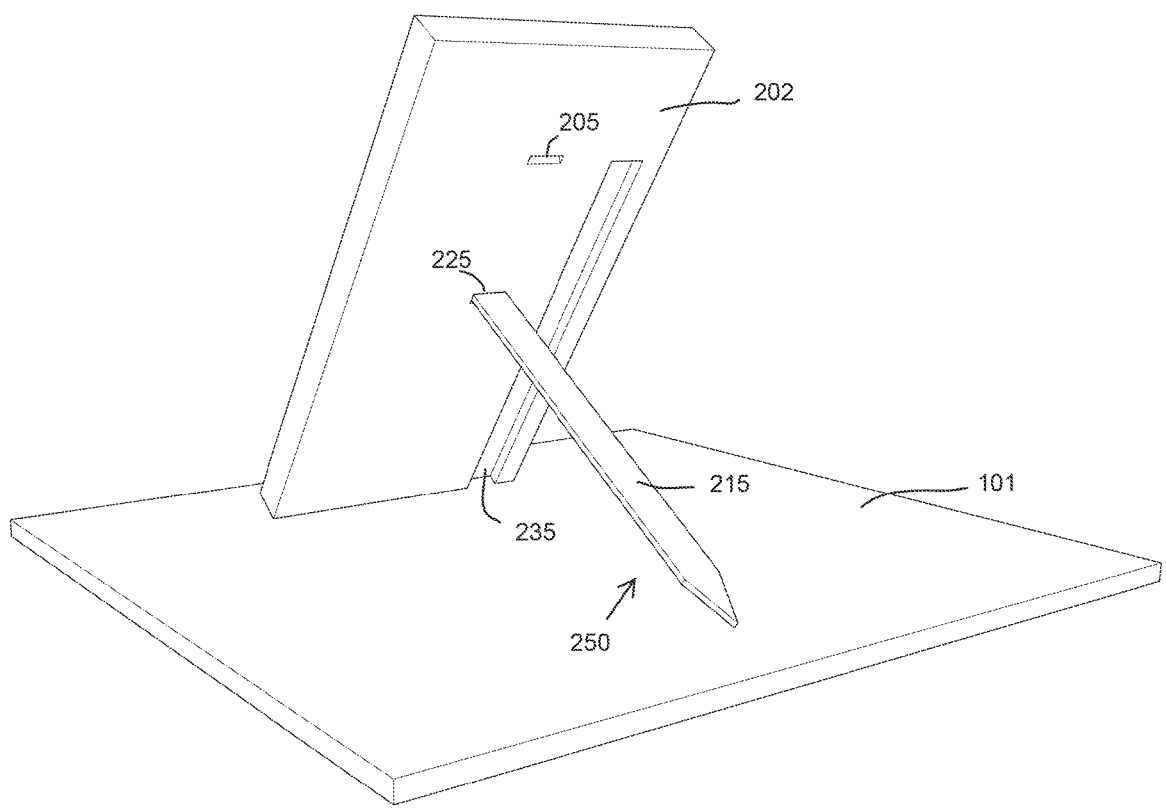
FIG. 12 illustrates a back perspective view of a stylus used to prop a personal information display and input device in an alternative portrait orientation using a different cavity in the back surface of the personal information display and input device enclosure.

FIG. 12 illustrates a back perspective view of the offset top 220 of flat stylus 250 fully inserted into bottom cavity 225 of the protective cover of personal information display and input device 200 in order prop that device at a more inclined angular position in the portrait orientation.

Figure 13:
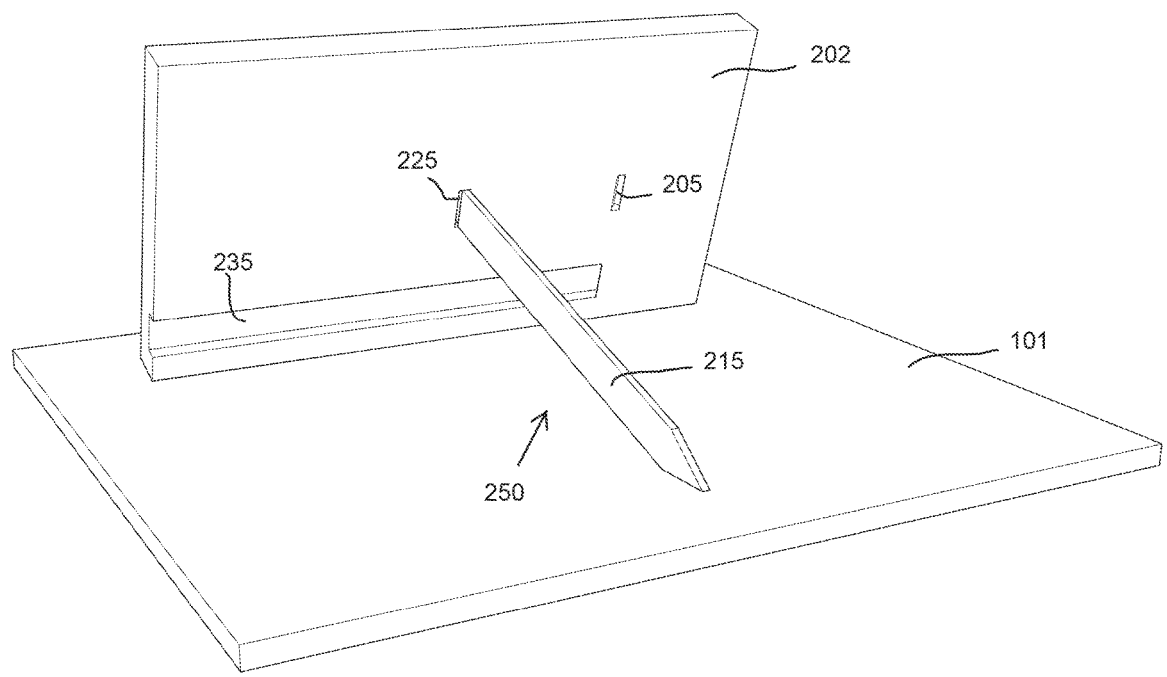
FIG. 13 illustrates a back perspective view of a stylus used to prop a personal information display and input device in a landscape orientation using the same cavity used in FIG. 12 to prop the personal information display and input device in an alternative portrait orientation.

FIG. 13 illustrates a back perspective view of the offset top 220 of flat stylus 250 fully inserted into bottom cavity 225 of the protective cover of personal information display and input device 200 in order prop that device in a landscape orientation using the same cavity used in FIG. 12 to prop the same device in an alternative portrait orientation.

Figure 14:
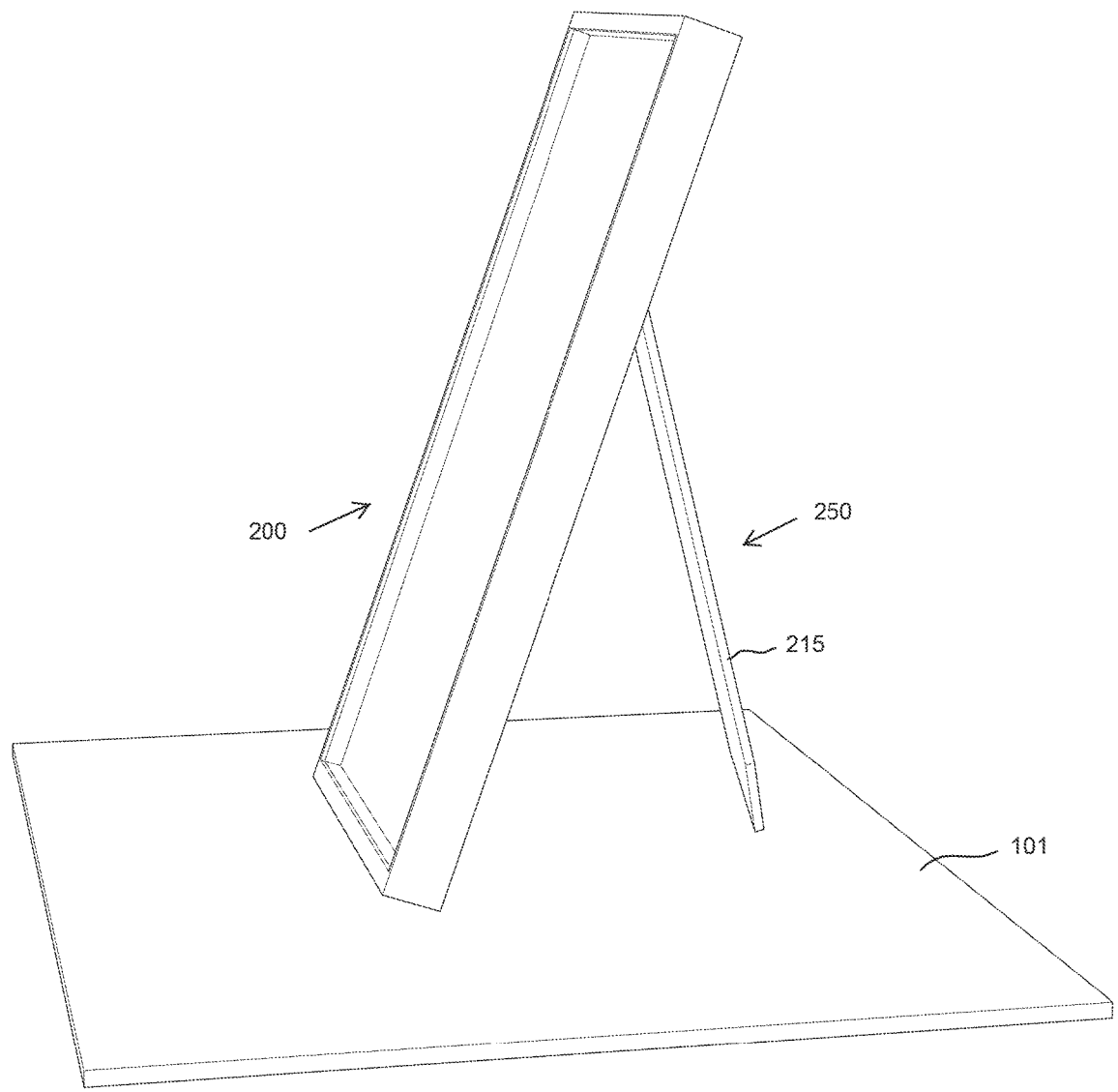
FIG. 14 illustrates a three dimensional perspective side view of a personal information display and input device being propped by a flat shaped stylus in the portrait orientation.

FIG. 14 illustrates a three dimensional perspective side view of the offset top 220 of flat stylus 250 inserted into top cavity 205 of the protective cover of personal information display and input device 200 in order prop that device at a specific angular position in the portrait orientation.

Figure 15:
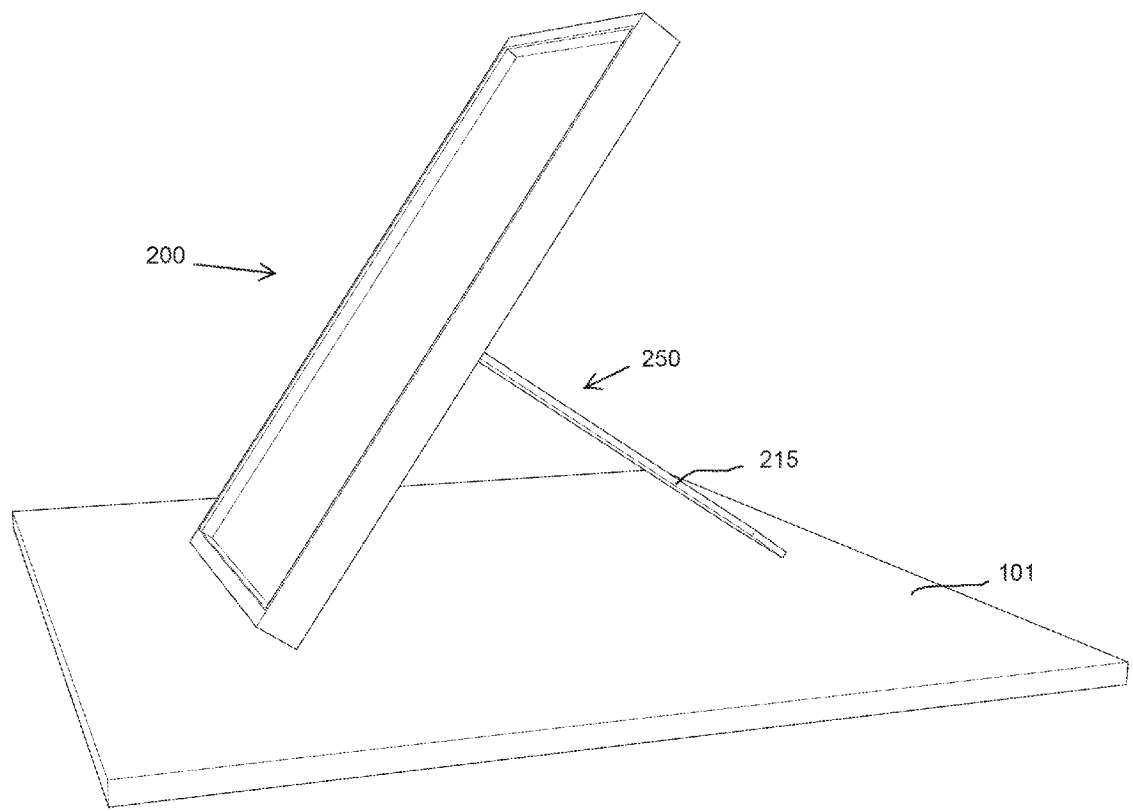
FIG. 15 illustrates a three dimensional perspective side view of a personal information display and input device being propped by a flat shaped stylus in the portrait orientation at an alternative angular position.

FIG. 15 illustrates a three dimensional perspective side view of the offset top 220 of flat stylus 250 fully inserted into bottom cavity 225 of the protective cover of personal information display and input device 200 in order prop that device at a more inclined angular position in the portrait orientation.

Figure 16:
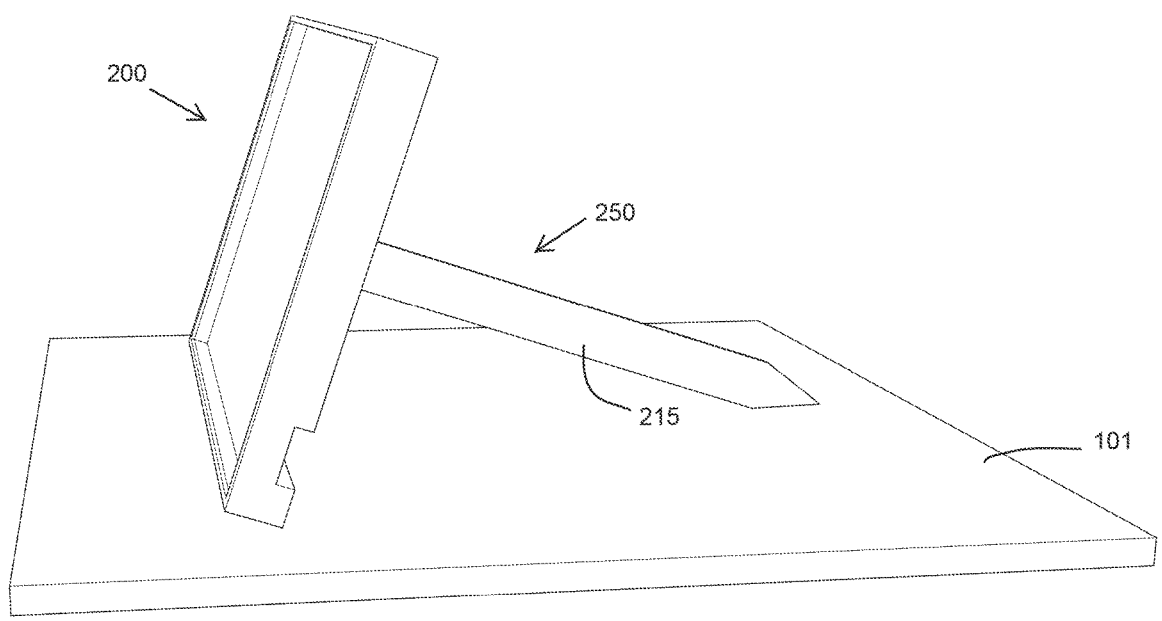
FIG. 16 illustrates a three dimensional perspective side view of a personal information display and input device being propped by a flat shaped stylus in the landscape orientation.

FIG. 16 illustrates a three dimensional perspective side view of the offset top 220 of flat stylus 250 fully inserted into bottom cavity 225 of the protective cover of personal information display and input device 200 in order prop that device in a landscape orientation using the same cavity used in FIG. 15 to prop the same device in an alternative portrait orientation.

Figure 17:
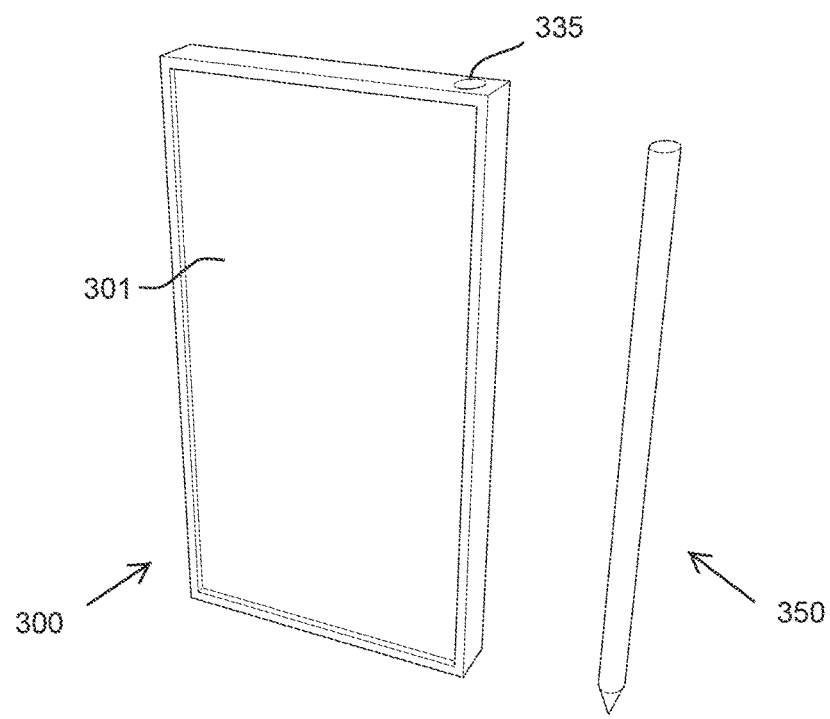
FIG. 17 illustrates a front view of an embodiment of a personal information display and input device with an associated cylindrical stylus.

FIG. 17 illustrates a front view of an embodiment of a protective cover for a personal information display and input device 300 containing a pen silo 335 with an associated cylindrical stylus 350.

Figure 18:
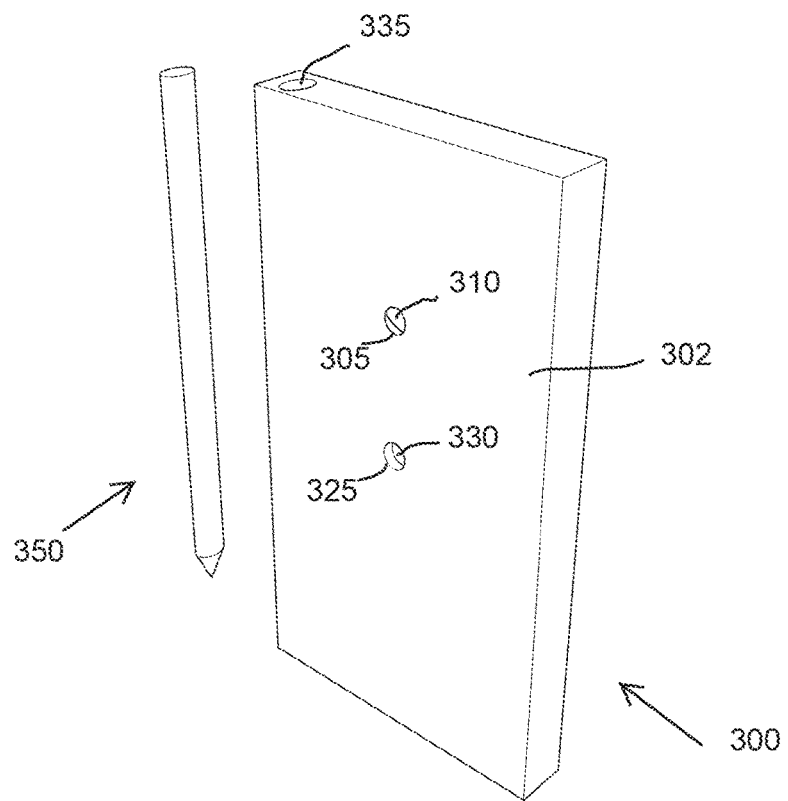
FIG. 18 illustrates a back view of an embodiment of a personal information display and input device with round cavities carved on the back surface of the personal information display and input device; cavities which are shaped to receive an end of a cylindrical stylus at varying angles.

FIG. 18 illustrates a 3D back view of a non-limiting embodiment of an enveloping protective cover for a personal information display and input device 300 that includes a pen silo, with the back side of its back panel 302 exposed, along with an associated cylindrically shaped stylus 350. The back side of the back panel 302 includes cavity 305 with a slanted cylindrical wall 310 located in the top tier of protective cover 300 and a second cavity 325 with a straight cylindrical wall 330 located in the middle of protective cover 300.

Figure 19:
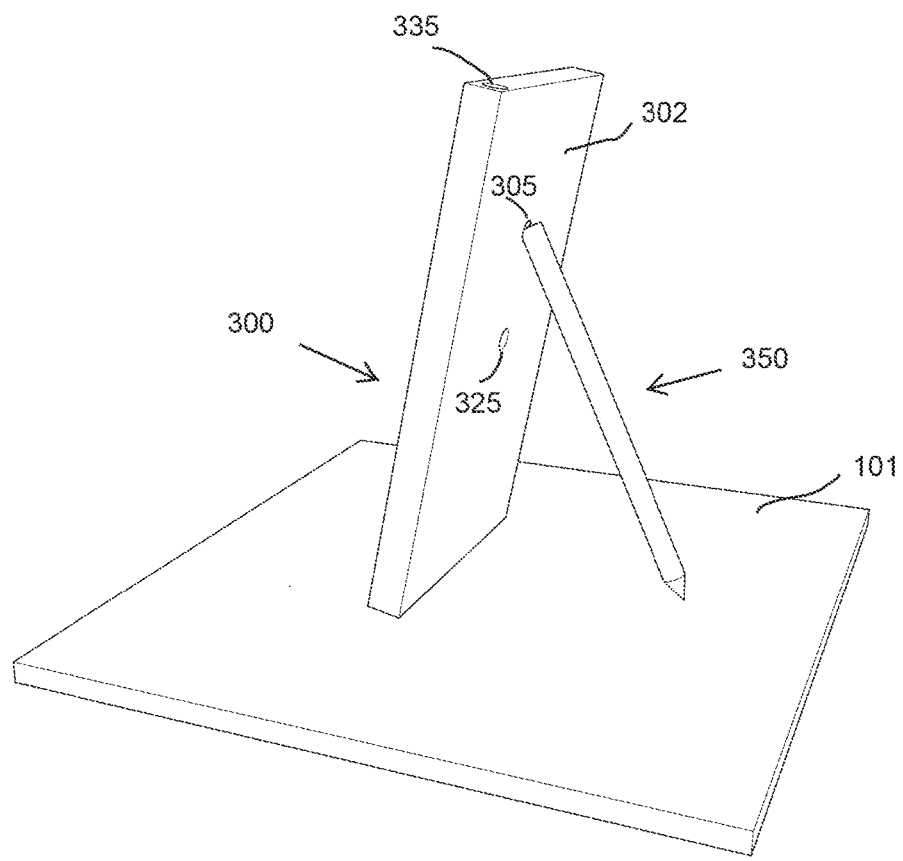
FIG. 19 illustrates a three dimensional perspective side view of a personal information display and input device being propped by a cylindrically shaped stylus in the portrait orientation.

FIG. 19 illustrates a three dimensional side perspective view of cylindrically shaped stylus 350 inserted into top cavity 305 of the protective cover of personal information display and input device 300 in order prop that device at a specific angular position in the portrait orientation.

Figure 20:
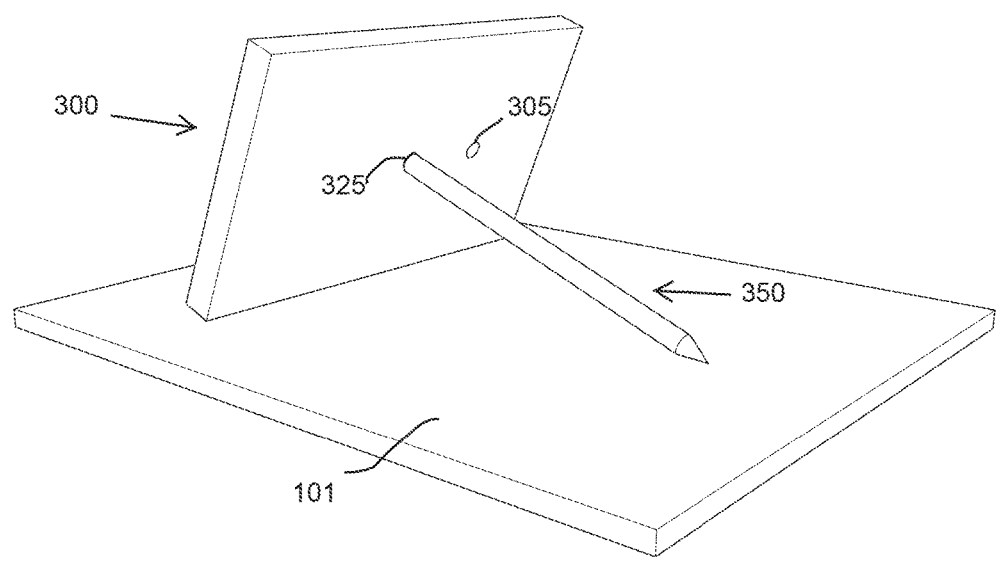
FIG. 20 illustrates a three dimensional perspective side view of a personal information display and input device being propped by a cylindrically shaped stylus in the landscape orientation.

FIG. 20 illustrates a three dimensional back perspective of a personal information display and input device 300 being propped by a cylindrically shaped stylus 350 in the landscape orientation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support mechanism for using a support element, such as a stylus, an independent arm, or plate, to prop and position an electronic information display and input device to various angles and orientations with respect to a resting surface or base, the support mechanism comprising:
   a back plate of an electronic information display and input device; or a protective cover of an electronic information display and input device; or a panel that can be adhered to the back plate of an electronic information display and input device;
   wherein the back plate, protective cover, or panel, comprises at least two cavities or notches, each cavity or notch comprising straight or slanted walls, or a combination of both; with each cavity or notch configured to receive, fully or partially, one end of a matching support element; such as a stylus, an independent arm, or plate at a specific angle and orientation with respect to the back plate, protective cover, or panel; and
   wherein the support element is used to prop the electronic information display and input device to discrete angles and orientations with respect to a resting surface or base by manually keying one end of the support element into a matching cavity or notch located in the back plate, protective cover, or panel, and placing the other end of the support element on a resting surface or base wherein the back plate, protective cover, or back panel of the electronic information display and input device comprises an open recession on one side of the back plate, protective cover, or back panel for receiving and stowing the support element; wherein the open recession is adjacent to and is aligned with an edge of the back plate, protective cover, or back panel.

2. The mechanism of claim 1 wherein at least one end of the support element is magnetized and the matching cavities or notches on the back plate; protective cover, or panel comprise, or are layered by, a metallic substance.

3. The mechanism of claim 1 wherein at least one end of the support element is metallic and the matching cavities or notches on the back plate, protective cover, or panel comprise, or are layered by, a magnetic substance.

* * * * *